(12) United States Patent
Alidedeoglu et al.

(10) Patent No.: US 8,946,345 B2
(45) Date of Patent: *Feb. 3, 2015

(54) METHOD FOR THE PREPARATION OF (POLYBUTYLENE-CO-ADIPATE TEREPHTHALATE) THROUGH THE IN SITU PHOSPHORUS CONTAINING TITANIUM BASED CATALYST

(75) Inventors: Husnu Alp Alidedeoglu, Evansville, IN (US); Hareesh Shamroa Deshpande, Bangalore (IN); Belinda Duckworth, Mount Vernon, IN (US); Tukaram Gunale, Bangalore (IN); Darshan Jayanna, Tumkur (IN); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,390

(22) Filed: Mar. 29, 2012

(65) Prior Publication Data

US 2013/0079458 A1    Mar. 28, 2013

Related U.S. Application Data

(63) Continuation-in-part of application No. 13/221,159, filed on Aug. 30, 2011, now abandoned.

(51) Int. Cl.
| | | |
|---|---|---|
| C08G 18/42 | (2006.01) | |
| C08G 63/85 | (2006.01) | |
| C08F 4/76 | (2006.01) | |
| C08J 11/24 | (2006.01) | |
| C08G 63/183 | (2006.01) | |
| C08L 67/02 | (2006.01) | |

(52) U.S. Cl.
CPC . *C08G 63/85* (2013.01); *C08F 4/76* (2013.01); *C08J 11/24* (2013.01); *C08G 63/183* (2013.01); *C08L 67/02* (2013.01); *C08J 2367/02* (2013.01)
USPC .......... 524/539; 524/537; 524/605; 528/279; 502/167; 502/202; 502/208

(58) Field of Classification Search
None
See application file for complete search history.

(56) References Cited

U.S. PATENT DOCUMENTS

| | | |
|---|---|---|
| 2,012,267 A | 8/1929 | Carothers |
| 3,634,089 A | 1/1972 | Hamb |
| 3,669,921 A | 6/1972 | Droke et al. |
| 3,833,685 A | 9/1974 | Wambach |
| 3,951,886 A | 4/1976 | Miyake et al. |
| 3,953,539 A | 4/1976 | Kawase et al. |
| 3,989,664 A | 11/1976 | Kawase et al. |
| 4,128,526 A | 12/1978 | Borman |
| 4,178,277 A | 12/1979 | Gebauer et al. |
| 4,328,059 A | 5/1982 | Horlbeck et al. |
| 4,401,804 A | 8/1983 | Wooten et al. |
| 4,452,933 A | 6/1984 | McCready |
| 4,482,700 A | 11/1984 | Kuhnrich et al. |
| 4,500,575 A | 2/1985 | Taira et al. |
| 4,617,373 A | 10/1986 | Pruett et al. |
| 4,659,615 A | 4/1987 | Ishii et al. |
| 5,266,601 A | 11/1993 | Kyber et al. |
| 5,268,420 A | 12/1993 | Nishimura et al. |
| 5,271,985 A | 12/1993 | Tsunashima et al. |
| 5,378,796 A | 1/1995 | George et al. |
| 5,391,263 A | 2/1995 | Hepner et al. |
| 5,391,362 A | 2/1995 | Reinalda et al. |
| 5,413,681 A | 5/1995 | Tustin et al. |
| 5,446,079 A | 8/1995 | Buchanan et al. |
| 5,451,611 A | 9/1995 | Chilukuri et al. |
| 5,453,479 A | 9/1995 | Borman et al. |
| 5,498,749 A | 3/1996 | Heise et al. |
| 5,554,657 A | 9/1996 | Brownscombe et al. |
| 5,559,159 A | 9/1996 | Sublett et al. |
| 5,744,503 A | 4/1998 | Smith et al. |
| 5,817,721 A | 10/1998 | Warzelhan et al. |
| 5,844,023 A | 12/1998 | Tomka |
| 5,866,710 A | 2/1999 | Ridland et al. |
| 5,869,543 A | 2/1999 | Boos et al. |
| 6,020,393 A | 2/2000 | Khemani |
| 6,066,714 A | 5/2000 | Putzig et al. |
| 6,096,809 A | 8/2000 | Lorcks et al. |
| 6,120,895 A | 9/2000 | Kowitz et al. |
| 6,133,404 A | 10/2000 | Kang et al. |
| 6,166,170 A | 12/2000 | Putzig |
| 6,201,034 B1 | 3/2001 | Warzelhan et al. |
| 6,231,970 B1 | 5/2001 | Andersen et al. |
| 6,235,815 B1 | 5/2001 | Loercks et al. |

(Continued)

FOREIGN PATENT DOCUMENTS

| | | |
|---|---|---|
| DE | 19638488 A1 | 3/1998 |
| EP | 0103531 B1 | 3/1984 |

(Continued)

OTHER PUBLICATIONS

Kleeberg et al. (Appl. Environ. Microbiol. 64, 5, 1731-1735).*
U.S. Appl. No. 13/183,807; filed with USPTO on Jul. 15, 2011.
U.S. Appl. No. 13/183,821; filed with USPTO on Jul. 15, 2011.
U.S. Appl. No. 13/221,159; filed with USPTO on Aug. 30, 2011.
JP60147430 Abstract; 1 page.

(Continued)

*Primary Examiner* — Susannah Chung
*Assistant Examiner* — Robert T Butcher
(74) *Attorney, Agent, or Firm* — Cantor Colburn LLP; Diderico van Eyl

(57) ABSTRACT

Biodegradable compositions containing an aliphatic-aromatic copolyester derived from aromatic polyesters. Methods of making the compositions through an in situ phosphorus containing titanium based catalyst and articles made from the compositions.

23 Claims, No Drawings

(56) References Cited

U.S. PATENT DOCUMENTS

| | | |
|---|---|---|
| 6,303,738 B1 | 10/2001 | Putzig et al. |
| 6,384,129 B1 | 5/2002 | Lowry |
| 6,472,497 B2 | 10/2002 | Loercks et al. |
| 6,472,557 B1 | 10/2002 | Pell, Jr. et al. |
| 6,518,322 B1 | 2/2003 | West |
| 6,521,717 B1 | 2/2003 | Itoh |
| 6,573,340 B1 | 6/2003 | Khemani et al. |
| 6,582,818 B2 | 6/2003 | Haile et al. |
| 6,649,731 B2 | 11/2003 | Hori et al. |
| 6,660,211 B2 | 12/2003 | Topolkaraev et al. |
| 6,703,115 B2 | 3/2004 | Hale et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,841,597 B2 | 1/2005 | Bastioli et al. |
| 6,998,462 B2 | 2/2006 | Duan et al. |
| 7,037,959 B1 | 5/2006 | Willett et al. |
| 7,160,977 B2 | 1/2007 | Hale et al. |
| 7,166,690 B2 | 1/2007 | Kim |
| 7,176,251 B1 | 2/2007 | Bastioli et al. |
| 7,241,832 B2 | 7/2007 | Khemani et al. |
| 7,241,838 B2 | 7/2007 | Shelby et al. |
| 7,354,653 B2 | 4/2008 | Germroth et al. |
| 7,368,503 B2 | 5/2008 | Hale |
| 7,368,511 B2 | 5/2008 | Hale et al. |
| 7,737,246 B2 | 6/2010 | Crawford |
| 7,799,836 B2 | 9/2010 | Agarwal et al. |
| 7,910,645 B2 | 3/2011 | Ahmed et al. |
| 8,038,658 B2 | 10/2011 | Kohama |
| 8,088,834 B2 | 1/2012 | Agarwal et al. |
| 2001/0014388 A1 | 8/2001 | Bastioli et al. |
| 2002/0111409 A1 | 8/2002 | Talibuddin |
| 2004/0092672 A1 | 5/2004 | Bastioli et al. |
| 2004/0254330 A1 | 12/2004 | Duan et al. |
| 2005/0113534 A1 | 5/2005 | Agarwal et al. |
| 2005/0137304 A1 | 6/2005 | Strand et al. |
| 2006/0257676 A1 | 11/2006 | Itada et al. |
| 2007/0010648 A1 | 1/2007 | Partridge et al. |
| 2007/0066794 A1 | 3/2007 | Jernigan |
| 2007/0079945 A1 | 4/2007 | Noda et al. |
| 2007/0082573 A1 | 4/2007 | Noda et al. |
| 2007/0082981 A1 | 4/2007 | Noda et al. |
| 2007/0093634 A1 | 4/2007 | Salsman et al. |
| 2007/0208160 A1 | 9/2007 | Agarwal et al. |
| 2007/0244242 A1 | 10/2007 | Agarwal et al. |
| 2007/0264460 A1 | 11/2007 | Del Tredici |
| 2007/0275242 A1 | 11/2007 | Gopal et al. |
| 2007/0276069 A1 | 11/2007 | Agarwal et al. |
| 2008/0039571 A1 | 2/2008 | Cohoon et al. |
| 2008/0274320 A1 | 11/2008 | Yokoyama et al. |
| 2008/0311385 A1 | 12/2008 | Miyazaki et al. |
| 2009/0169772 A1 | 7/2009 | Yamada et al. |
| 2009/0274885 A1 | 11/2009 | Egawa |
| 2009/0275698 A1 | 11/2009 | Ravi et al. |
| 2010/0041831 A1* | 2/2010 | Chung et al. ............ 525/186 |
| 2010/0168317 A1 | 7/2010 | Cahoon-Brister |
| 2010/0168336 A1 | 7/2010 | Cohoon-Brister |
| 2011/0003964 A1 | 1/2011 | Agarwal et al. |
| 2011/0071235 A1 | 3/2011 | Kannan et al. |
| 2011/0120346 A1 | 5/2011 | Reisacher et al. |
| 2011/0178265 A1 | 7/2011 | Tanaka et al. |
| 2012/0232191 A1 | 9/2012 | Auggermann et al. |
| 2013/0030116 A1* | 1/2013 | Okaniwa et al. ............ 524/592 |

FOREIGN PATENT DOCUMENTS

| | | |
|---|---|---|
| EP | 0331746 B1 | 6/1984 |
| EP | 0272417 A2 | 6/1988 |
| EP | 0573680 A1 | 12/1993 |
| EP | 0634435 A1 | 1/1995 |
| EP | 0736557 A1 | 10/1996 |
| EP | 0575349 B2 | 8/2003 |
| EP | 1344765 A1 | 9/2003 |
| EP | 1426404 A1 | 6/2004 |
| EP | 1437377 A1 | 7/2004 |
| EP | 1473324 A1 | 11/2004 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| WO | 0185824 A2 | 11/2001 |
| WO | 2005017034 A1 | 2/2005 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2009127556 A1 | 10/2009 |
| WO | 2010034711 A1 | 4/2010 |
| WO | 2010077809 A1 | 7/2010 |
| WO | 2011054786 A1 | 5/2011 |
| WO | 2013012706 A1 | 1/2013 |
| WO | 2013012707 A1 | 1/2013 |
| WO | 2013033285 A1 | 3/2013 |

OTHER PUBLICATIONS

International Search Report for International Application No. PCT/US2012/046625; International Filing Date Jul. 13, 2012; Date of Mailing Dec. 20, 2012, 4 pages.

Written Opinion of the International Search Report for International Application No. PCT/US2012/046625; International Filing Date Jul. 13, 2012; Date of Mailing Dec. 20, 2012; 6 pages.

International Search Report for International Application No. PCT/US2012/046627; International Filing Date Jul. 13, 2012; Date of Mailing Dec. 12, 2012.

Written Opinion of the International Search Report for International Application No. PCT/US2012/046627; International Filing Date Jul. 13, 2012; Date of Mailing Dec. 12, 2012.

International Search Report for International Application No. PCT/US2012/046629; International Filing Date Jul. 13, 2012; Date of Mailing Dec. 20, 2012; 4 pages.

Written Opinion of the International Search Report for International Application No. PCT/US2012/046629; International Filing Date Jul. 13, 2012; Date of Mailing Dec. 20, 2012; 6 pages.

International Search Report for International Patent Application No. PCT/US2012/052971; International Filing Date Aug. 30, 2012; Date of Mailing Dec. 10, 2012; 5 pages.

Written Opinion of the International Search Report for International Patent Application No. PCT/US2012/052971; International Filing Date Aug. 30, 2012; Date of Mailing Dec. 10, 2012; 7 pages.

U.S. Appl. No. 13/409,898; filed with USPTO on Mar. 1, 2012.
U.S. Appl. No. 13/409,983; filed with USPTO on Mar. 1, 2012.
U.S. Appl. No. 13/432,638; filed with USPTO on Mar. 29, 2012.
U.S. Appl. No. 13/435,865; filed with USPTO on Mar. 30, 2012.

Chang et al.; "Copolyesters. VII. Thermal Transitions of Poly(butylene terephthalate-co-isophthalate-co-adipate)s"; vol. 51; Issue 6; Feb. 1994; pp. 999-1004.

English Abstract of EP0007445 A1; Date of Publication Feb. 6, 1980; 1 page.

English Abstract of EP0519367 A1; Date of Publication Dec. 23, 1992; 2 pages.

English Abstract of EP2258545 A1; Date of Publication Dec. 8, 2010; 2 pages.

English Abstract of JP2000109665 A; Date of Publication Apr. 18, 2000; 1 page.

English Abstract of JP2003220645 A; Date of Publication Aug. 5, 2003; 1 page.

English Abstract of JP2004050769 A; Date of Publication Feb. 19, 2004; 1 page.

English Abstract of JP2004098321 A; Date of Publication Apr. 2, 2004; 2 pages.

English Abstract of JP2004204038 A; Date of Publication; 1 page.
English Abstract of JP2005052479 A; Date of Publication Mar. 3, 2005; 2 pages.

English Abstract JP2005220278 A; Aug. 18, 2005; 1 page.

(56) References Cited

OTHER PUBLICATIONS

English Abstract JP2008045117 A; Date of Publication Feb. 28, 2008; 2 pages.
English Abstract of JP3776578 B2; Date of Publication May 17, 2006; 1 page.
International Search Report for International Application No. PCT/JP2009/064418; International Date of Publication Nov. 10, 2009; Date of Mailing Nov. 17, 2009; 2 pages.
International Search Report for International Application No. PCT/US2012/026046; Date Mailed May 18, 2012; 5 pages.
Written Opinion of the International Search Report for International Application No. PCT/US2012/026046; Date of Mailing May 18, 2012; 8 pages.
International Search Report for International Application No. PCT/US2012/026048; Date Mailed May 18, 2012; 5 pages.
Written Opinion for International Application No. PCT/US2012/026048; Date Mailed May 18, 2012; 8 pages.
International Search Report for International Application PCT/US2012/026051; International Filing Date Feb. 22, 2012; Date of Mailing Aug. 3, 2012; 5 pages.
Written Opinion of the International Search Report for PCT/US2012/026051; International Filing Date Feb. 22, 2012; Date of Mailing Aug. 3, 2012; 9 pages.
Ukielski et al.; "Effect of Chemical Modification of Poly(butylene terephthalate) on elastic properties"; International Polymer Science and Technology, vol. 31, No. 3; Jan. 2004; 6 pages.
Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.
DE 19638488 A1 English Abstract; Date of Publication Mar. 26, 1998 2 pages.
JP19840003496 English Abstract; Date of Publication Aug. 3, 1985; 2 pages.
Machine Translation of JP2004098321; Apr. 2004; 6 pages.
JP9087370A with English Abstract; Date of Publication Mar. 31, 1997; 6 pages.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907, International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application PCT/US2012/068909; International Date of Filing Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
International Search Report for International Application No. PCT/US2012/71902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.
International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
Patent Cooperation Treaty; International Preliminary Report on Patentability; PCT/US2012/052971; Date of mailing: Mar. 13, 2014, 7 pages.
Scheirs et al.; "Modern Polyesters: Chemistry and Technology of Polyesters and Copolyesters"; 2003; pp. 293-321.

* cited by examiner

METHOD FOR THE PREPARATION OF (POLYBUTYLENE-CO-ADIPATE TEREPHTHALATE) THROUGH THE IN SITU PHOSPHORUS CONTAINING TITANIUM BASED CATALYST

CROSS-REFERENCE TO RELATED APPLICATION

This application is a continuation-in-part of U.S. application Ser. No. 13/221,159, filed Aug. 30, 2011, which is incorporated herein by reference in its entirety.

BACKGROUND

This disclosure relates to an aliphatic-aromatic copolyester of poly(butylene-co-adipate terephthalate) from polyethylene terephthalate, compositions and articles containing the copolyester, a process for preparing the copolyester, and an in situ phosphorus containing titanium based catalyst.

Thermoplastic molding compositions based on polybutylene terephthalate (PBT) are used in various applications. Although useful to many customers, conventional PBT molding compositions generally cannot be made from recycled sources of PBT due to the lack of availability of large post-consumer or post-industrial supplies of PBT scrap materials. Polyethylene terephthalate (PET), unlike PBT, is made in much larger quantities and is more easily recovered from consumer wastes.

With increasing demand for conserving non-renewable resources and more effectively recycling underutilized scrap PET, improved and less costly processes for deriving PBT from scrap PET materials are sought, in particular if the resulting derived PBT compositions possess desirable physical properties such as tensile and impact strength, and thermal properties. It would be particularly advantageous if the process were compatible with PET blend compositions comprising other polymer components and/or impurities.

BRIEF DESCRIPTION OF THE INVENTION

Described herein is an aliphatic-aromatic copolyester, comprising: a dihydric alcohol group selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof; an aromatic dicarboxylic acid group derived from a depolymerized aromatic polyester component selected from poly(ethylene terephthalate)s, poly(butylene terephthalate)s, poly(trimethylene terephthalate)s, and combinations thereof; a titanium catalyst composition comprising titanium and a color-reducing amount of a compound selected from phosphorus-containing compounds, nitrogen-containing compounds, boron-containing compounds, and combinations thereof; an adipic acid group; and an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof; wherein the aliphatic-aromatic copolyester has a number average molecular weight of at least 20,000 Daltons and a polydispersity index from 2 to less than 6.

In another embodiment, a composition is provided comprising a combination of: from more than 10 to 59.96 wt. %, based on the total weight of the composition, of the aliphatic-aromatic copolyester; from more than 40 to less than 89.96 wt. %, based on the total weight of the composition, of a polymer selected from aliphatic polyesters, aliphatic polycarbonates, starches, aromatic polyesters, cycloaliphatic polyesters, polyesteramides, aromatic polycarbonates, and combinations thereof; from 0.01 to 5 wt. %, based on the total weight of the composition, of an additive selected from nucleating agents, antioxidants, UV stabilizers, plasticizers, epoxy compounds, melt strength additives, and combinations thereof; from 0.01 to 45 wt. %, based on the total weight of the composition, of an additive selected from alcohols, acetates, alcohol-acetate copolymers, and combinations thereof; and from 0.01 to 2 wt. %, based on the weight of the composition, of an additive selected from crosslinkers, anti-aging agents, retrogradation agents such as fatty acids including stearic acid, palmitic acid, and combinations thereof, anti-blocking agents, water, odor-controlling agents, and combinations thereof.

In still another embodiment a process for preparing the copolyester is provided, comprising: depolymerizing the aromatic polyester component, by reacting the aromatic polyester component with a diol component selected from ethylene glycol, 1,2-propylene glycol, 1,3-propylene glycol, 1,2-butanediol, 2,3-butanediol, 1,4-butanediol, tetramethyl cyclobutanediol, isosorbide, 1,3-cyclohexanedimethanol isomers, 1,4-cyclohexanedimethanol isomers, hexylene glycol, bio-derived diols, and combinations thereof, in the presence of an adipic acid component selected from adipic acid, adipic acid oligomers, and combinations thereof, in a reactor, at a pressure that is at least atmospheric pressure, at a temperature from 160° C. to 250° C., under an inert atmosphere and with agitation, under conditions sufficient to depolymerize the aromatic polyester component into a molten mixture; and increasing the temperature of the molten mixture under sub-atmospheric conditions and agitation to a temperature from 240° C. to 270° C., thereby forming the copolyester; wherein the process is carried out in the presence of the titanium catalyst composition comprising titanium and a color-reducing amount of a compound selected from phosphorus-containing compounds, nitrogen-containing compounds, boron-containing compounds, and combinations thereof.

In yet another embodiment, a titanium catalyst composition is provided comprising titanium and a color-reducing amount of a compound selected from phosphorus-containing compounds, nitrogen-containing compounds, boron-containing compounds, and combinations thereof.

These and other features, aspects, and advantages of the present invention will become better understood with reference to the following description and appended claims.

DETAILED DESCRIPTION OF THE INVENTION

Our invention is based on the discovery that it is now possible to produce poly(butylene-co-adipate terephthalate) from poly(ethylene terephthalate) feedstock, including recycled poly(ethylene terphthalate), and a selected group of diols, a selected group of aromatic dicarboxylic acids, an adipic acid group, and an aromatic polyester residue, in the presence of a titanium catalyst composition comprising titanium and a color-reducing amount of a compound selected from phosphorus-containing compounds, nitrogen-containing compounds, boron-containing compounds, and combinations thereof.

The titanium catalyst comprises the reaction product of tetraisopropyl titanate and a reactant selected from:

(1) phosphorus-containing compounds, at a molar ratio of the phosphorus-containing compound:tetraisopropyl titanate from more than 0.5:1 to less than or equal to 3:1, (2) nitrogen-containing compounds, at a molar ratio of the nitrogen-containing compound:tetraisopropyl titanate from more than 0.5:1 to less than or equal to 4:1, and (3) boron-containing compounds, at a molar ratio of the boron-containing compound:tetraisopropyl titanate from more than 0.5:1 to less than or equal to 4:1, and (4) combinations thereof.

Phosphorus-containing compounds include phosphoric acid, poly(phosphoric acid), phosphorous acid, monobutyl phosphate, dibutyl phosphate, monoalkyl phosphates, dialkyl phosphates, or combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

More particularly, our invention is based on the discovery that poly(butylene-co-adipate terephthalate) copolymers of good quality and appearance are produced with this catalyst.

The term "white," as used in this application, means that the material being described as white exhibits an L* value that is at least 70, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 70, or 80, or 85 to 100. The "L*, a, b" method for describing colors is will known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is. a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4F_{18}$)—), and the term "ethylene glycol group" means the group or residue of ethylene glycol having the formula (—O($C_2H_4$)—).

Processes for preparing copolyesters by depolymerizing aromatic polyesters in the presence of polyols are known in the art. For example, U.S. Pat. No. 5,451,611 describes a process for converting waste polyethylene terephthalate to either poly(ethylene-co-butylene terephthalate) or polybutylene terephthalate by reaction with BDO. A principal objective of U.S. Pat. No. 5,451,611 was to provide a process for converting PET waste directly to another high value polymer without breaking down the PET to its constituent monomers or oligomers. The patent discloses numerous examples in which a variety of polymers have a combination of diols incorporated at various ratios of amounts. Example 11 of U.S. Pat. No. 5,451,611 shows a PBT polymer being formed with a complete replacement of EG by BDO. U.S. Pat. No. 5,266,601 and U.S. Pat. No. 20090275698 (A1) describe a process for making "PBT" from PET by reacting PET with BDO.

The aromatic polyester component from which the aliphatic-aromatic copolyester is made can be in a variety of forms. Generally, in the case of polyethylene terephthalate the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The first dihydric alcohol groups incorporated into the copolyester can be derived from any dihydric alcohol that reacts with the aliphatic dicarboxylic acid and the aromatic polyester to form the first dihydric alcohol group in the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. In another embodiment, the dihydric alcohol is selected from 1,4-butanediol, 1,3-propanediol, ethylene glycol, and combinations thereof.

Any of the foregoing dihydric alcohols can be derived from a biological source. In one embodiment all or a portion of the dihydric alcohols are derived from a biological source. "Bio-derived diols" as used herein refers to alcohols other than those named and derived from a biological source, e.g., various pentoses, hexoses, and the like. The first dihydric alcohol is generally added to a mixture containing the aromatic polyester and the aliphatic dicarboxylic acid.

The aromatic dicarboxylic acid group is incorporated into the copolyester when the aromatic polyester reacts with the first dihydric alcohol and the aliphatic dicarboxylic acid under conditions sufficient to form the copolyester. Examples of the aromatic dicarboxylic acid group include isophthalic acid groups, terephthalic acid groups, naphthalic acid groups and a combination thereof. The aromatic dicarboxylic group in the polyester may also be derived from corresponding di($C_1$ to $C_3$) alkyl esters. In a preferred embodiment, the aromatic dicarboxylic acid group is derived from terephthalic acid or di(C1-3)alkyl ester thereof. The aromatic polyester is thus a polyester containing aromatic dicarboxylic acid residues, and can be any aromatic polyester, which when reacted with the first dihydric alcohol and an aliphatic dicarboxylic acid, forms a copolyester containing aromatic dicarboxylic acid groups, first dihydric alcohol groups, and second dihydric alcohol groups.

In one embodiment, the aromatic polyester contains (i) at least 40 mole % of total acid groups as aromatic dicarboxylic acid groups and (ii) is selected from the group consisting of poly(ethylene terephthalate), poly(butylene terephthalate), polypropylene terephthalate, copolymers of the foregoing, and combinations thereof. Specific examples of suitable aromatic polyesters include poly(ethylene terephthalate), poly(butylene terephthalate), polytrimethylene terephthalate, and combinations thereof. The aromatic polyester can be petroleum-derived or bio-derived, and in one embodiment is a recycled aromatic polyester, for example recycle poly(ethylene terephthalate). The recycle polyester can be in any form, e.g., flakes, pellets, and the like.

The aliphatic dicarboxylic acid group is incorporated into the copolyester when the aromatic polyester reacts with the first dihydric alcohol and the aliphatic dicarboxylic acid to form the copolyester. Examples of the aliphatic dicarboxylic acid include components having the general formula $(CH_2)_m(COOH)_2$, where m is an integer from 2 to 10. The aliphatic dicarboxylic acid can be decanedioic acid, adipic acid, or sebacic acid. When the aliphatic dicarboxylic acid is adipic acid, the value of m is 4. When the aliphatic dicarboxylic acid is sebacic acid, the value m is 8. In one embodiment all or a portion of the aliphatic dicarboxylic acid is a bio-derived aliphatic dicarboxylic acid.

The aliphatic-aromatic copolyester further comprises a second dihydric alcohol group that is derived from the aromatic polyester, and that is incorporated into the copolyester when the first dihydric alcohol reacts with the aromatic polyester in the presence of the aliphatic dicarboxylic acid. As such, unlike the first dihydric alcohol, the second dihydric alcohol is not added to a mixture containing the polyester and the aliphatic dicarboxylic acid. Examples of suitable second dihydric alcohol groups can include the residues of ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), hexylene glycol, and a combination thereof. Because the second dihydric alcohol groups are derived from the aromatic polyester, the first and the second dihydric alcohol groups can be the same or different. For example, the first dihydric alcohol groups can be residues of 1,4-butanediol, 1,3-propanediol, ethylene glycol, or combinations thereof and the second dihydric alcohol groups can be ethylene glycol, diethylene glycol, 1,3-propanediol, 1,4-butanediol, or combinations thereof. The first dihydric alcohol groups and the second dihydric alcohol groups are the same in one embodiment. The first dihydric alcohol groups and the second dihydric alcohol groups are different in another embodiment.

In a specific embodiment, the first dihydric alcohol is 1,4-butanediol, 1,3-propanediol, ethylene glycol, or a combination thereof the aliphatic dicarboxylic acid is decanedioic acid, adipic acid, sebacic acid, or a combination thereof, the second dihydric alcohol group is the residue of ethylene glycol, 1,3-propanediol, 1,4-butanediol, or a combination thereof, and the aromatic polyester is a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, and combinations thereof.

In another embodiment, the aromatic dicarboxylic ester groups comprise the polymerization product of dimethyl terephthalate derived from recycled PET and the dihydric alcohol, and further wherein the copolyester further comprises a dimethyl terephthalate residual composition. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the polyester and yield the corresponding diesters of the terephthalic acid, such as dimethyl terephthalate (DMT).

The amount of the first dihydric alcohol group and the second dihydric alcohol group in the copolyester can vary. In one embodiment, the first dihydric alcohol group is present in an amount from 80 to 99.6 mole % of total dihydric alcohol content and the second dihydric alcohol group is present in an amount from 0.4 mole % to 20.0 mole % of the total dihydric alcohol content. In another embodiment, the first dihydric alcohol group is present in an amount from 85 to 99.4 mole % of total content of dihydric alcohol groups in the composition and the second dihydric alcohol group is present in an amount from 0.6 to 15.0 mole % of the total dihydric alcohol content.

The relative amounts of the aromatic dicarboxylic acid group and the aliphatic dicarboxylic acid group can vary. In one embodiment, the aromatic dicarboxylic group and the aliphatic dicarboxylic group have an aromatic dicarboxylic group:aliphatic dicarboxylic group mole ratio from 0.6:1 to 6:1. In another embodiment, the aromatic dicarboxylic group and the aliphatic dicarboxylic group are present at an aromatic dicarboxylic group:aliphatic dicarboxylic group mole ratio from 0.6:1 to 1.3:1.

The content of aromatic acid groups (in particular isophthalic acid groups and terephthalic acid groups) in the copolyester will vary depending on the aromatic polyester used and the reaction conditions. In one embodiment the aromatic dicarboxylic acid group contains from 0.2 to 3.0 mole % of isophthalic acid group and from 47 to 49.8 mole % percent of terephthalic acid groups, based on the total moles of acid groups present in the copolymer.

In a specific embodiment, the first dihydric alcohol group is present in an amount from 80 to 99.6 mole % of the total dihydric alcohol content and the second dihydric alcohol group is present in an amount from 0.4 mole % to 20.0 mole % of the total dihydric alcohol content, the aromatic dicarboxylic group and the aliphatic dicarboxylic group have an aromatic dicarboxylic group:aliphatic dicarboxylic mole ratio from 0.6:1 to 6:1, and the aromatic dicarboxylic acid group contains from 0.2 to 3.0 mole % of isophthalic acid groups and from 47 to 49.8 mole % terephthalic acid groups, each based on the total moles of dicarboxylic acid groups in the copolymer.

The copolyesters can further comprise other residues present in the aromatic polyester, including catalyst residues from the manufacture of the aromatic polyester, residues from additives in the aromatic polyester, or residues arising from side reactions that occur during manufacture of the aromatic polyester and/or the reaction of the first dihydric alcohol, the aliphatic diacid, and the aromatic polyester.

For example, when the aromatic polyester includes a poly(ethylene terephthalate) component, the aromatic polyester can include a poly(ethylene terephthalate) homopolymer, a poly(ethylene terephthalate) copolymer, or a combination thereof, and the aliphatic-aromatic copolyester contains a residue derived from the poly(ethylene terephthalate) composition. Residues derived from the poly(ethylene terephthalate) component can be ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the poly(ethylene terephthalate) component comprises ethylene glycol groups, diethylene glycol groups, and more particularly a combination of ethylene glycol groups, diethylene glycol groups.

Accordingly, our invention includes embodiments in which the residue derived from the poly(ethylene terephthalate) component includes individual elements and combinations of the foregoing materials. The residue derived from the poly(ethylene terephthalate) component, for instance, can comprise isophthalic acid groups. In an embodiment, the residue derived from the poly(ethylene terephthalate) component further comprises the cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol and combinations thereof. In one embodiment, the residue derived from the poly(ethylene terephthalate) component includes a combination of ethylene glycol and diethylene glycol groups, optionally with isophthalic acid groups, and can further comprise the cis isomer of 1,3-cyclohexanedimethanol, the cis isomer of 1,4-cyclohexanedimethanol, the trans isomer of 1,3-cyclohexanedimethanol, trans isomer of 1,4-cyclohexanedimethanol, or combinations thereof. In an embodiment, the residue derived from the polyethylene terephthalate component comprises ethylene glycol groups, diethylene glycol groups, isophthalic acid groups, the cis isomer of cyclohexanedimethanol, the trans isomer of cyclohexanedimethanol, and combinations thereof. In an embodiment, the residue derived from the poly(ethylene terephthalate) component comprises ethylene glycol groups, diethylene glycol groups, and cobalt-containing compounds; in another embodiment the a residue derived from the poly(ethylene terephthalate) component further comprises isophthalic acid groups.

When the aromatic polyester is poly(butylene terephthalate), the composition can contain poly(butylene terephthalate) residues such as butane diol, titanium, tin, or combinations thereof, optionally together with epoxies.

When the aromatic polyester is poly(trimethylene terephthalate), the composition contains poly(trimethylene terephthalate) residues such as propane diol, titanium, tin, or combinations thereof.

The copolyester generally has a number average molecular weight of at least 20,000 Daltons and a polydispersity index from 2 to less than 6, specifically 2 to 5. In one embodiment, the copolyester has a glass transition temperature (Tg) from −35° C. to 0° C. In another embodiment, the copolyester has a melting temperature (Tm) from 90° C. to 160° C.

The copolyester can also be made with additional materials that can be present during any of the manufacturing steps, or added after formation of the molten copolyester, or after cooling of the molten copolyester.

For example, in an optional embodiment, the molten copolyester is further reacted with a phosphate compound for an effective time, for example at least 5 minutes, specifically from 5 minutes to two hours. In this embodiment, the aliphatic-aromatic copolyester further comprises a residue of the phosphate compound, either associated with the copolymer or covalently bound to the copolymer. Examples of the compound containing a phosphate group include inorganic phosphate-containing compounds such as phosphoric acid, zinc phosphate, and the like. The phosphate compound can be present in an amount from 0 to 0.10 wt. % of the molten copolyester. Reacting can be at a temperature of, for example, less than or equal to 250° C.

In another optional embodiment, the molten copolyester is further reacted with an addition copolymer comprising the residue of a glycidyl ester monomer for an effective time, for example at least 5 minutes, specifically from 5 minutes to two hours. In this embodiment, the aliphatic-aromatic copolyester further comprises a residue of the addition copolymer, either associated with the copolymer or covalently bound to the copolymer. Examples of the an addition copolymer based on a glycidyl monomer include an addition copolymer comprising the residue of glycidyl acrylate, glycidyl methacrylate, or a combination thereof and the residue of methyl methacrylate, methyl acrylate, styrene, alpha-methyl styrene, butyl methacrylate butyl acrylate, or combinations thereof, for example styrene and methyl methacrylate. The addition copolymer can be present in an amount from 0 to 1.50 wt. % of the molten copolyester. Reacting can be at a temperature of, for example, less than or equal to 250° C.

The biodegradable composition of the invention includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, cycloaliphatic polyesters, polyesteramides, combinations thereof and the like. The polymers can be wholly or partially bio-derived, including petroleum-derived aromatic polyesters and bio-derived aromatic polyesters. In the art, chain extenders such as epoxides, bisoxazolines, biscaprolactams, dianhydrides, etc. have been reported for use in polyesters. Among these, epoxides are most widely used on a commercial scale due to their relatively low cost and availability of a variety of structures.

In a specific embodiment the copolyester is combined with an aliphatic polyester, for example poly(lactic acid), poly(hydroxyalkanoate), poly(butylene succinate), poly(butylene adipate), poly(butylene succinate adipate) and poly(caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt % and the amount of polylactic acid can range from 10 to 60 wt %, specifically 40 to 60%, based on the total weight of the composition.

The composition may also contain from 0.01 to 45 wt. %, based on the total weight of the composition, of an additive selected from alcohols, acetates, alcohol-acetate copolymers, and combinations thereof. Additionally, the composition may contain from 0.01 to 2 wt. %, based on the weight of the composition, of an additive selected from crosslinkers, anti-aging agents, retrogradation agents, anti-blocking agents, water, odor-controlling agents, and combinations thereof.

Additives ordinarily incorporated into polymer compositions can be used, with the proviso that the additives are selected so as to not significantly adversely affect the desired properties of the composition, for example biodegradability, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In one embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, extrusion molded, blow molded, solvent cast or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

As stated above, various combinations of the foregoing embodiments can be used. The invention is further described in the following illustrative examples in which all parts and percentages are by weight unless otherwise indicated.

EXAMPLES

Following is a list of materials, acronyms, and selected sources used in the examples.
ADA: Adipic Acid (from INVISTA)
BDO: 1,4-Butanediol (from BASF, with a purity specification of 99.5 wt. %)
Phosphoric Acid: Phosphoric Acid (from Acros)
Phosphorous Acid: Phosphorous Acid (from Acros)
Boric Acid: Boric Acid (from Aldrich)
Ethanol Amine: Ethanol Amine (from Fisher)
TPT: Tetraisopropyl titanate (from DuPont, commercial Tyzor grade)
Tyzor® IAM: Titanium alkoxide phosphate (from DuPont, commercial Tyzor grade)
Vertec™ NPZ: Zirconium Tetrapropanolate (Johnson Matthey, commercial grade)
Tyzor® PC-64: Titanium ethylene glycol (from DuPont, commercial Tyzor grade)
DBTO: Dibutyl tin dioxide (from Aldrich)
PBT-co-adipate: Poly(butylene terephthalate)-co-adipate
PET: Poly(ethylene terephthalate)
Recycle PET: Recycle PET in the form of flakes or pellets was obtained from a commercial vendor headquartered in India.

Examples 1-2

The purpose of Examples 1-2 was to manufacture the polyester PBT-co-adipate derived from PET in accordance with the invention. The materials, amounts, and reaction conditions are shown in Table 1.

TABLE 1

Materials and Conditions for Examples 1-4.

| Ex. No. | Scale of Reaction (g) | PET:BDO (mol/mol) | ADA:BDO (mol/mol) | Phosphoric Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 1 | 143 | 0.39 | 0.39 | 1:1 | 250 | 220 | 24 | 260 | 42 |
| 2 | 143 | 0.39 | 0.39 | 1:1 | 250 | 220 | 33 | 260 | 49 |
| 3 | 143 | 0.39 | 0.39 | 1:0.5 | 250 | 220 | 26 | 250 | 58 |
| 4 | 143 | 0.39 | 0.39 | 1:0.75 | 250 | 220 | 35 | 250 | 54 |

Techniques and Procedures

Example 1

Example 1 was conducted in the presence of a phosphorus-containing catalyst prepared in situ by complexation between TPT and phosphoric acid in 1:1 mole ratio. Accordingly, 50 g of BDO and 0.5 ml of phosphoric acid solution in water (0.1 g/mL) were introduced into a three neck round bottom flask. The reactor was placed in an oil bath, the temperature of which was adjusted to 175° C. After 20 minutes, 250 ppm of TPT was added to the reactor and an in situ reaction between phosphoric acid and TPT was carried for 40 minutes under inert atmosphere. Then, 48 g of recycle PET, 36.5 g of ADA, and 30 g of additional BDO were introduced into the catalyst solution and the ester interchange temperature was increased to 220° C. at a rate of 2° C./min while stirring at 260 rpm under nitrogen. After the evolution of water/ethylene glycol ceased, the temperature of the reaction was further increased to 260° C. to melt the residual PET flakes completely. Polymerization was initiated with the vacuum adjusted to below 1 Torr for 90 minutes. The polymerization was stopped after achieving desired intrinsic viscosity. The resulting copolyester was white.

Example 2

Example 2 was prepared in the presence of the same in situ catalyst as in Example 1. First, 48 g of recycle PET, 50 g of BDO, and 0.5 ml of phosphoric acid solution in water (0.1 g/ml) were introduced into a three neck round bottom flask. The reactor was placed in an oil bath the temperature of which was adjusted to 175° C. After 20 minutes, 250 ppm of TPT was added to the reactor and an in situ complexation between phosphoric acid and TPT was carried for 45 minutes under inert atmosphere. Then, 36.5 g of ADA and 30 g of additional BDO were introduced into a catalyst solution and the ester interchange temperature was increased to 220° C. with a rate of 2° C./min while stirring at 260 rpm under nitrogen. The temperature of the reaction mixture was increased to 260° C. to melt the residual PET flakes completely. The polymerization stage was initiated with the vacuum adjusted to below 1 Torr for 90 minutes. The polymerization was stopped after achieving desired intrinsic viscosity. The resulting polymer exhibited a white color.

Example 3

Example 3 was prepared using the same procedure given in Example 1, except that in situ catalyst was prepared through the complexation between TPT and phosphoric acid in 1:0.5 mol ratio. The resulting polymer exhibited a red color.

Example 4

Example 4 was prepared using the same procedure given in Example 1, except the in situ catalyst, which was prepared through the complexation between TPT and phosphoric acid in 1:0.75 mol ratio. The resulting polymer exhibited light pink color.

Results

Table 2 shows the glass transition temperature (Tg), melting temperature (Tm) (obtained from DSC), molecular weight data (obtained from gel permeation chromatography (GPC)), intrinsic viscosity (I.V.), color (L*, a*, b* values obtained through the diffuse reflectance method acquired on a Gretag Macbeth Color-Eye 7000A with D65 illumination), and titanium and phosphorus concentration (obtained from the elemental analysis using inductive coupled plasma (ICP) microwave digestion method) of Examples 1-4.

TABLE 2

Results for Examples 1-4.

| Ex. No. | IV (dL/min) | $T_m$ (° C.) | $T_g$ (° C.) | PDI | Mn | Mw | L* | a* | b* | Ti (ppm) | P (ppm) |
|---|---|---|---|---|---|---|---|---|---|---|---|
| 1 | 1.33 | 112 | −24 | 4.0 | 36000 | 144000 | 77.8 | −2.2 | −0.2 | 332 | 180 |
| 2 | 1.37 | 111 | −24 | 4.0 | 37000 | 148000 | 77.1 | −1.7 | 2.0 | 278 | 195 |
| 3 | 1.29 | 120 | −26 | 4.0 | 31000 | 124000 | 60.0 | 20.5 | 19.1 | 275 | 84 |
| 4 | 1.18 | 117 | −27 | 3.7 | 29000 | 107000 | 74.9 | 6.5 | 12.0 | 279 | 114 |

Discussion

A novel polyesterification catalyst was prepared through the in situ reaction between phosphoric acid and TPT (1:1 mol ratio) in BDO solvent. An important consideration is to achieve a complete conversion in the reaction between the most acidic hydroxyl group of phosphoric acid and TPT. Once all strongly acidic hydroxyl groups are consumed, the ester interchange and polyesterification steps can be conducted without inhibition. The results indicate that the copolyester derived from PET was successfully prepared in accordance with the invention. The new in situ catalyst enabled the copolyester to obtain a high molecular weight and a white color. The melting temperatures of Examples 1-2 are very close to the melting temperature of commercially available copolyester. While satisfactory results have been achieved with catalyst inactivators, such an additional process step is costly and inefficient from a processing standpoint. The present approach can provide simplicity and color elimination and suitable for large scale-up process. Examples 3-4 show that the ratio between phosphoric acid and TPT plays an important role in the elimination of the melt color. As seen from elemental analysis, decrease in the ratio between titanium and phosphorus in the polymer melt resulted in the red coloration. Theoretically, a 1:1 mol ratio between phosphoric acid and TPT is the optimum ratio resulting in white color polyester.

Examples 5-7

The purpose of Examples 5-7 was to make the copolyester in accordance to the invention: PBT-co-Adipate derived from PET. The materials, amounts, and reaction conditions are shown in Table 3.

TABLE 3

Materials and Conditions for Examples 5-7.

| Example No | Scale of Reaction (g) | PET:BDO (mol/mol) | ADA:BDO (mol/mol) | Phosphorous Acid:TPT (mol/mol) | Catalyst Amount (ppm) | EI Temp. (° C.) | EI Time (min) | Poly Temp. (° C.) | Poly Time (min) |
|---|---|---|---|---|---|---|---|---|---|
| 5 | 143 | 0.39 | 0.39 | 1:1 | 250 | 220 | 30 | 260 | 45 |
| 6 | 143 | 0.39 | 0.39 | 2:1 | 250 | 220 | 33 | 260 | 59 |
| 7 | 143 | 0.39 | 0.39 | 3:1 | 250 | 220 | 32 | 260 | 64 |

Techniques and Procedures

Example 5

Example 5 was implemented in the presence of a new phosphorus containing polyester catalyst prepared as in situ through the complexation between TPT and phosphorous acid in 1:1 mol ratio. Thus, 50 g of BDO and 0.5 ml of phosphorous acid solution in water (0.1 g/ml) were introduced into a three neck round bottom flask. The reactor was placed in an oil bath the temperature of which was adjusted to 175° C. After 20 minutes, 250 ppm of TPT was added to the reactor and an in situ reaction between phosphorous acid and TPT was carried for 40 minutes under inert atmosphere. Then, 48 g of recycle PET, 36.5 g of ADA and 30 g of additional BDO were introduced into a catalyst solution and the ester interchange temperature was increased to 220° C. with a rate of 2° C./min while stirring at 260 rpm under nitrogen. After the evolution of water/ethylene glycol ceased, the temperature of the reaction was further increased to 260° C. to melt the residual PET flakes completely. Polymerization was initiated with the vacuum adjusted to below 1 Torr for 50 minutes. The polymerization was stopped after achieving desired intrinsic viscosity. The resulting polymer exhibited a red color.

Example 6

Example 6 was prepared using the procedure of Example 5, except that the in situ catalyst was prepared through the complexation between TPT and phosphorous acid in a 1:2 mol ratio (i.e., a phosphorus acid:TPT mole ratio of 2:1). The resulting polymer exhibited a light pink color.

Example 7

Example 7 was prepared using the procedure of Example 5, except that the in situ catalyst was prepared through the complexation between TPT and phosphorous acid in 1:3 mol ratio (i.e., a phosphorus acid:TPT mole ratio of 3:1). The resulting polymer exhibited a white color.

Results

Table 4 shows the glass transition temperature ($T_g$), melting temperature (Tm) obtained from DSC, molecular weight data obtained from gel permeation chromatography (GPC), intrinsic viscosity (I.V.), color (L*, a*, b* values obtained through the diffuse reflectance method acquired on a Gretag Macbeth Color-Eye 7000A with D65 illumination), and titanium and phosphorus concentration (obtained from the elemental analysis using inductive coupled plasma (ICP) microwave digestion method).

TABLE 4

Results for Examples 5-7.

| Ex. No. | IV (dL/min) | $T_m$ (°C.) | $T_g$ (°C.) | PDI | Mn | Mw | L* | a* | b* | Ti (ppm) | P (ppm) |
|---|---|---|---|---|---|---|---|---|---|---|---|
| 5 | 1.29 | 126 | −27 | 3.9 | 33000 | 130000 | 62.7 | 14.4 | 30.0 | 297 | 44 |
| 6 | 1.02 | 111 | −25 | 3.5 | 27000 | 100000 | 72.06 | 3.2 | 11.0 | 343 | 207 |
| 7 | 1.19 | 103 | −12 | 3.9 | 32000 | 125000 | 73.5 | −2.5 | −2.9 | 323 | 215 |

Discussion

A novel polyesterification catalyst was prepared through the in situ reaction between phosphorous acid and TPT in BDO solvent. It was observed that the reactivity of the phosphorous acid is lower compared to phosphoric acid. An important consideration in this step is to achieve a complete conversion in the reaction between the most acidic hydroxyl group of phosphoric acid and TPT. Once all strongly acidic hydroxyl groups are consumed, the ester interchanged and polyesterification steps can be conducted without inhibition. The results indicate that PBAT derived from PET was successfully prepared in accordance with the invention. The new in situ catalyst enabled the copolyester to obtain a high molecular weight and a white color. The melting temperatures of Examples 5-7 are very close to the melting temperature of commercial PBAT. This approach shows the use of phosphorous acid instead of phosphoric acid for color elimination and suitable for large scale-up process. Since the phosphorous acid acidity is lower than phosphoric acid, the optimum theoretical ratio between phosphorous acid and TPT is 3:1 to achieve white color polyester. As seen from elemental analysis, decrease in the ratio between titanium and phosphor element in the polymer melt resulted in the red coloration.

Examples 8-10

The purpose of Examples 8-10 was to make a copolyester in accordance to the invention: PBT-co-Adipate derived from PET. The overall quantity of individual materials taken and the reaction scale used in the laboratory for Examples 8-10 are indicated in Table 5

TABLE 5

Materials and Conditions for Examples 8-10.

| Ex. No | Scale of Reaction (g) | PET:BDO (mol/mol) | ADA:BDO (mol/mol) | Boric Acid:TPT (mol/mol) | Catalyst Amount (ppm) | EI Temp. (°C.) | EI Time (min) | Poly Temp. (°C.) | Poly Time (min) |
|---|---|---|---|---|---|---|---|---|---|
| 8 | 143 | 0.39 | 0.39 | 1:1 | 250 | 220 | 32 | 260 | 52 |
| 9 | 143 | 0.39 | 0.39 | 2:1 | 250 | 220 | 36 | 260 | 64 |
| 10 | 143 | 0.39 | 0.39 | 4:1 | 250 | 220 | 38 | 260 | 72 |

Techniques and Procedures

Example 8

Example 8 was implemented in the presence of a new boron containing polyester catalyst prepared in situ by complexation between TPT and boric acid in 1:1 mol ratio. Thus, 50 g of BDO and 0.5 ml of boric acid solution in water (0.062 g/ml) were introduced into a three neck round bottom flask. The reactor was placed in an oil bath the temperature of which was adjusted to 175° C. After 20 minutes, 250 ppm of TPT was added to the reactor and an in situ reaction between boric acid and TPT was carried for 40 minutes under inert atmosphere. Then, 48 g of recycle PET, 36.5 g of ADA and 30 g of additional BDO were introduced into a catalyst solution and the ester interchange temperature was increased to 220° C. at a rate of 2° C./min while stirring at 260 rpm under nitrogen. After the evolution of water/ethylene glycol ceases, the temperature of the reaction was further increased to 260° C. to melt the residual PET flakes completely. Polymerization was initiated with the vacuum adjusted to below 1 Torr for 50 minutes. The polymerization was stopped after achieving desired intrinsic viscosity. The resulting polymer exhibited a pink-brownish color.

Example 9

Example 9 was prepared using the procedure of Example 8, except the in situ catalyst was prepared through the complexation between TPT and boric acid in 1:2 mol ratio. The resulting polymer exhibited a white color.

Example 10

Example 10 was prepared using the procedure of in Example 8, except that the in situ catalyst was prepared through the complexation between TPT and boric acid in 1:4 mol ratio. The resulting polymer exhibited a white color.

Results

Table 6 shows the glass transition temperature (Tg), melting temperature (Tm) obtained from DSC, molecular weight data obtained from gel permeation chromatography (GPC), intrinsic viscosity (I.V.), and color (L*, a*, b* values obtained through the diffuse reflectance method acquired on a Gretag Macbeth Color-Eye 7000A with D65 illumination) for Examples 8-10.

TABLE 6

Results for Examples 8-10.

| Ex. No. | IV (dL/min) | $T_m$ (°C.) | $T_g$ (°C.) | PDI | Mn | Mw | L* | a* | b* |
|---|---|---|---|---|---|---|---|---|---|
| 8 | 1.20 | 120 | −25 | 3.5 | 30000 | 106000 | 73.7 | 0.06 | 11.3 |
| 9 | 1.16 | 112 | −25 | 3.5 | 29000 | 102000 | 77.0 | 2.3 | 9.4 |
| 10 | 1.04 | 114 | −24 | 3.4 | 28000 | 96000 | 75.7 | −0.4 | 10.0 |

Discussion

A novel polyesterification catalyst was prepared by the in situ reaction between boric acid and TPT in BDO solvent. It was observed that the reactivity of the boric acid is lower compared to phosphoric acid. An important consideration in this step is to achieve a complete conversion in the reaction between the most acidic hydroxyl group of boric acid and TPT. The results indicate that PBAT derived from PET was successfully prepared in accordance with the invention. The new in situ catalyst enabled the copolyester to obtain a high molecular weight and a white color. The melting temperatures of Examples 8-10 are very close to the melting temperature of commercial PBAT. This approach shows the use of boric acid instead of phosphoric acid for color elimination and suitable for large scale-up process. The optimum ratio between boric acid and TPT in the preparation of in situ catalyst is 4:1 to provide white color polyester.

Examples 11-12

The purpose of Examples 11-12 was to make a copolyester in accordance to the invention: PBT-co-Adipate derived from PET. The materials, amounts, and reaction conditions for Examples 11-12 are shown in Table 7.

TABLE 7

Materials and Conditions for Examples 11-12.

| Ex. No. | Scale of Reaction (g) | PET:BDO (mol/mol) | ADA:BDO (mol/mol) | Ethanol amine:TPT (mol/mol) | Catalyst Amount (ppm) | EI Temp. (° C.) | EI Time (min) | Poly Temp (° C.) | Poly Time (min) |
|---|---|---|---|---|---|---|---|---|---|
| 11 | 143 | 0.39 | 0.39 | 1:1 | 250 | 220 | 30 | 260 | 45 |
| 12 | 143 | 0.39 | 0.39 | 4:1 | 250 | 220 | 32 | 260 | 64 |

Techniques and Procedures

Example 11

Example 11 was implemented in the presence of a new nitrogen containing polyester catalyst prepared as in situ through the complexation between TPT and ethanol amine in 1:1 mol ratio. 50 g of BDO, 0.5 ml of ethanol amine solution in water (0.062 g/ml) were introduced into a three neck round bottom flask. The reactor was placed in an oil bath the temperature of which was adjusted to 175° C. After 20 minutes, 250 ppm of TPT was added to the reactor and an in situ reaction between boric acid and TPT had been carried for 40 minutes under inert atmosphere. Then, 48 g of recycle PET, 36.5 g of ADA and 30 g of additional BDO were introduced into a catalyst solution and the ester interchange temperature was increased to 220° C. with a rate of 2° C./min while stirring at 260 rpm under nitrogen. After the evolution of water/ethylene glycol ceases, the temperature of the reaction was further increased to 260° C. to melt the residual PET flakes completely. Polymerization was initiated with the vacuum adjusted to below 1 Torr for 50 minutes. The polymerization was stopped after achieving desired intrinsic viscosity. The resulting polymer exhibited a pink color.

Example 12

Example 12 was prepared using the same procedure given in Example 11, except the in situ catalyst, which was prepared through the complexation between TPT and the ethanol amine in 1:4 mol ratio. Resulting polymer exhibited white color.

Results

Table 8 provides the glass transition temperature ($T_g$), melting temperature ($T_m$) obtained from DSC, molecular weight data obtained from gel permeation chromatography (GPC), intrinsic viscosity (I. V.), and color (L*, a*, b* values obtained through the diffuse reflectance method acquired on a Gretag Macbeth Color-Eye 7000A with D65 illumination).

TABLE 8

Results for Examples 11-12.

| Ex. No. | IV (dL/min) | $T_m$ (° C.) | $T_g$ (° C.) | PDI | Mn | Mw | L* | a* | b* |
|---|---|---|---|---|---|---|---|---|---|
| 11 | 1.24 | 120 | −28 | 3.4 | 28000 | 96000 | 71.9 | 10.1 | 22.3 |
| 12 | 1.07 | 117 | −24 | 3.8 | 32000 | 121000 | 67.4 | 8.0 | 20.5 |

Discussion

A novel polyesterification catalyst was prepared through the in situ reaction between ethanol amine and TPT in BDO solvent. Since the ethanol amine is basic relative to phosphoric acid, phosphorous acid and boric acid, the in situ catalyst prepared from high ratio between ethanol amine and TPT resulted in colored polyesters. The melting temperatures of Examples 11-12 are very close to the melting temperature of commercial PBAT.

Examples 13-18

The purpose of Examples 13-18 was to investigate the effect of the various catalysts on the final color of the copolymer. The materials, amounts, and reaction conditions are shown in Table 9.

TABLE 9

Materials and Conditions for Examples 13-18.

| Ex. No | Scale of Reaction (g) | PET:BDO (mol/mol) | ADA:BDO (mol/mol) | Catalyst | Catalyst Amount (ppm) | EI Temp. (° C.) | EI Time (min) | Poly Temp. (° C.) | Poly Time (min) |
|---|---|---|---|---|---|---|---|---|---|
| 13* | 143 | 0.39 | 0.39 | TPT | 250 | 220 | 26 | 250 | 35 |
| 14* | 143 | 0.39 | 0.39 | DBTO | 250 | 220 | 39 | 250 | 245 |
| 15* | 143 | 0.39 | 0.39 | Titanium Glycolide | 33 | 220 | 28 | 250 | 60 |
| 16* | 143 | 0.39 | 0.39 | Tyzor ® PC-64 | 33 | 220 | 20 | 250 | 54 |

TABLE 9-continued

Materials and Conditions for Examples 13-18.

| Ex. No | Scale of Reaction (g) | PET:BDO (mol/mol) | ADA:BDO (mol/mol) | Catalyst | Catalyst Amount (ppm) | EI Temp. (° C.) | EI Time (min) | Poly Temp. (° C.) | Poly Time (min) |
|---|---|---|---|---|---|---|---|---|---|
| 17 | 143 | 0.39 | 0.39 | Tyzor ® IAM | 33 | 220 | 35 | 260 | 117 |
| 18* | 143 | 0.39 | 0.39 | Vertec ® NZP | 250 | 220 | 35 | 250 | 125 |

*13-16 and 18 are Comparative Example

Techniques and Procedures

Comparative Example 13

Example 13 was prepared by the melt condensation reaction between PET flakes, ADA, and BDO in the presence of TPT transesterification catalyst. Accordingly, 70 g of BDO and 36.5 g of ADA and 48 g of PET flakes were introduced into a three neck round bottom flask. The reactor was placed in an oil bath, the temperature of which was adjusted to 170° C. 250 ppm of TPT was added to the reactor and the ester interchange temperature was increased to 220° C. at a rate of 2° C./min while stirring at 260 rpm under nitrogen. After the evolution of water/ethylene glycol ceased, the temperature of the reaction was further increased to 250° C. to melt the residual PET flakes completely. Polymerization was initiated with the vacuum adjusted to below 1 Torr for 90 minutes. The polymerization was stopped after achieving desired intrinsic viscosity. The resulting copolyester was red.

Comparative Example 14

Example 14 was implemented using the same formulation as in Example 13, except for polymerization catalyst, which was 250 ppm of dibutyltin oxide (DBTO), and polymerization temperature, which was 250° C. The resulting copolyester was yellow.

Comparative Examples 15-16

Examples 15-16 were implemented using the same formulation as in Example 13 except for polymerization catalyst (Example 15: titanium glycolide; Example 16: Tyzor® PC-64), and polymerization temperature, which was 250° C.

Example 17

Example 17 was implemented using the same formulation as in Example 13 except for polymerization catalyst (Tyzor® IAM and 0.1 weight % trisnonylphenyl phosphite (TNPP)), and polymerization temperature, which was 260° C.

Comparative Example 18

Example 18 was implemented using the same formulation as in Example 13 except for polymerization catalyst (Vertec™ NPZ) and polymerization temperature, which was 250° C.

Results

Table 10 shows the glass transition temperature (Tg), melting temperature (Tm) (obtained from DSC), molecular weight data (obtained from gel permeation chromatography (GPC)), intrinsic viscosity (I.V.), and color (L*, a*, b* values obtained through the diffuse reflectance method acquired on a Gretag Macbeth Color-Eye 7000A with D65 illumination) of Examples 13-18.

TABLE 10

Results for Examples 13-18.

| Ex. No. | Catalyst | Catalyst Amount (ppm) | IV (dL/min) | $T_m$ (° C.) | $T_g$ (° C.) | PDI | Mn | Mw | L* | a* | b* |
|---|---|---|---|---|---|---|---|---|---|---|---|
| 13* | TPT | 250 | 0.99 | 116 | −24 | 4.6 | 28000 | 125000 | 62.0 | 12.2 | 13.6 |
| 14* | DBTO | 250 | 0.88 | 111 | −22 | 3.9 | 30000 | 102000 | 73.3 | −5.5 | 14.5 |
| 15* | Titanium Glycolide | 33 | 1.17 | 118 | −26 | 3.5 | 35000 | 120000 | 73.9 | 0.0 | 15.0 |
| 16* | Tyzor ® PC-64 | 33 | 1.34 | 119 | −25 | 3.5 | 34500 | 124000 | 80.8 | −8.6 | 13.3 |
| 17 | Tyzor ® IAM | 33 | 1.32 | 112 | −23 | 4.0 | 34000 | 137000 | 75.8 | −1.7 | −2.8 |
| 18* | Vertec ™ NPZ | 250 | 1.16 | 50 | −13 | 3.8 | 28000 | 106000 | 73.9 | −0.1 | 5.0 |

*13-16 and 18 are Comparative Examples

Discussion

Without being bound by theory, it is believed that the electronic nature of TPT favors the formation of coordination complexes with adipic acid. Accordingly, different organo-titanium or tin-based transesterification catalysts were investigated. All catalysts in Examples 13-17 resulted in high molecular weight copolyesters, low polydispersities, and melting temperatures similar to the commercially-available copolyesters. A very slow polyesterification kinetic was observed in the presence of DBTO (Table 10, Example 14). The final color of the copolyester was slightly yellow. Examples 13 and 15-17 were prepared in the presence of the various titanium-based catalyst. The use of titanium glycolide and TYZOR® PC-64 at the polymerization temperature of 250° C. resulted in slightly pink copolyesters.

JP 60-147430 discloses a method of producing polyester by esterifying terephthalic acid, adipic acid, and 1,4-butanediol in the presence of titanium compound and a pentavalent phosphorus compound. U.S. Pat. No. 6,303,738 discloses a process for producing copolyester containing adipic acid in the presence of TYZOR® IAM, which is prepared through the combination of TPT and a mixture of butyl phosphate and dibutyl phosphate. Copolyester produced in the presence of this catalyst was white. Without being bound by theory, it is believed that the presence of the pentavalent phosphorous ligand in TYZOR® IAM changes the electronic density around titanium, which makes the complexation of titanium with adipic acid ester unfavorable.

Vertec™ NPZ, zirconium propanolate, was used to replace titanium-based catalyst to break down the complexation capability of adipate ester. Even though the zirconium-based catalyst slows the kinetics, the copolyester produced with this catalyst exhibited white color. Without being bound by theory, it is believed that zirconium based catalysts do not produce complexation with adipate esters.

Examples 19-24

The purpose of Examples 19-24 is to scale-up in Nelson Reactor (300 g) PBAT resin using novel catalyst system. The materials, amounts, and reaction conditions are shown in Table 11.

Techniques and Procedures depolymerization and esterification was conducted at 240° C. and at atmospheric pressure. The reactor top and vapor line temperature were maintained at 200° C. to ensure there is no reflux of condensed vapor. The condensation products, consisting of EG, water and Tetrahydrofuran (THF) were collected through a condenser and monitored. The overheads collection rate slowed down significantly, suggesting completion of ester interchange (EI) reaction, at around 60 min from the start of the reaction. The reactor pressure was reduced gradually to <1 mbar using a vacuum pump. This resulted in excess BDO being distilled off from the reactor and conditions favoring polycondensation leading to an increase in polymer molecular weight. The reactor jacket temperature was also increased so that the melt temperature remains within 250 and 260° C. When the vacuum reached below 2 mbar the time was noted as zero time for polymerization. The molecular weight build up was indicated by increased torque. The shear heating increased the temperature of the melt, which was controlled (250-260° C.) by reducing the jacket temperature. Once the required value of torque was reached, the reaction was stopped by breaking the vacuum by nitrogen gas. The polymer melt was drained through bottom discharge valve.

TABLE 11

Effect of TPT:Phosphoric acid mol ratio on PBAT synthesis

| No. | Poly Time (min) | TPT: Phosphoric acid ratio (mol) | Backbone composition mol % | | | | $T_m$ (° C.) | $T_g$ (° C.) | IV | Color | | | P content (ppm) (Theoretical) | Ti content (ppm) (Theoretical) |
|---|---|---|---|---|---|---|---|---|---|---|---|---|---|---|
| | | | TPA | AA | BDO | EG | | | | L* | a* | b* | | |
| 19 | 180 | 1:1.5 | 24.8 | 26.2 | 31.0 | 18.0 | 76.7 | −35.7 | No build | 68.4 | 0.8 | 7.7 | 210 (242) | 164 (250) |
| 20 | 120 | 1:1 | 25.1 | 25.1 | 39.7 | 10.1 | 96.0 | −25.9 | 0.666 | 73.3 | 0.2 | 7.8 | 159 (161) | 199 (250) |
| 21 | 120 | 1:0.75 | 25.3 | 24.9 | 41.8 | 8.0 | 104.9 | −25.0 | 1.088 | 75.2 | 0.1 | 7.7 | 137 (121) | 148 (250) |
| 22 | 120 | 1:0.6 | 25.4 | 24.7 | 43.5 | 6.4 | 110.2 | −25.3 | 1.304 | 73.9 | 0.6 | 9.7 | 113 (97) | 182 (250) |
| 23 | 120 | 1:0.5 | 25.9 | 23.8 | 48.4 | 1.8 | 108.3 | −25.6 | 1.355 | 69.1 | 6.6 | 12.3 | 65 (80) | 184 (250) |
| 24 | 110 | 1:0 | 25.64 | 24.1 | 48.6 | 1.61 | 109.98 | −25.93 | 1.516 | 62.7 | 16.2 | 16.9 | 0 (0) | 11 (100) |

Preparation of PBAT in Nelson Reactor (Approx. 300 Gm Scale)

The experimental work was carried out in 750 ml capacity Stainless Steel (SS316 grade) reactor equipped with double helical coil agitator, overhead heated vapor line to remove the overheads, liquid nitrogen catch pot to trap volatile overheads and vacuum pump. First, recycle PET (0.75 mol) and BDO (1.95 mole) and calculated amount of 85% phosphoric acid was taken into the reactor. The reactor contents were then heated to 170° C. After 20 min, 465 mg of TPT (250 ppm of Ti based on the final polymer wt.) was added to the reactor and the temp was raised to 200° C. The contents were kept for 30 min under stirring to ensure complete reaction between TPT and phosphoric acid. After 30 min ADA (0.75 mol) was added to the reactor and the temperature was raised to 240° C. The Discussion Table 11 also shows the glass transition temperature (Tg), melting temperature (Tm) (obtained from DSC), intrinsic viscosity (I.V.), color (L*, a*, b* values obtained through the diffuse reflectance method acquired on a Gretag Macbeth Color-Eye 7000A with D65 illumination). It was found that the molar ratio of TPT:phosphoric acid plays an important role. If this ratio is large, inadequate complexation will happen and the polymer will give color (pink) and if the ratio is small then complete reaction between TPT and phosphoric acid will occur and the complex would not have adequate catalytic activity for the polymerization itself (because of this the color may disappear from the final polymer but it will not build adequate molecular weight.). It is also found that the geometry of the reactor is directly affecting the optimum molar ratio of TPT:phosphoric acid. In lab scale the optimum ratio was 1:1. When the same in situ reaction was implemented in Nelson Reactor, the optimum ratio was changed to 1:0.6.

Examples 25-27

The purpose of Examples 25-27 is to prove the effect of BDO:(PET+AA) mol ratio on the melting point and backbone composition of PBAT. The materials, amounts, and reaction conditions are shown in Table 12.

TABLE 12

Effect of BDO:(PET + AA) mol ratio on the melting point of PBAT.

| No. | Poly Temp (° C.) | BDO: (PET + AA) ratio (mol) | Backbone composition (mol %) | | | | $T_m$ (° C.) | $T_g$ (° C.) | IV | Color | | | P content ppm (Theoretical) | Ti content ppm (Theoretical) |
|---|---|---|---|---|---|---|---|---|---|---|---|---|---|---|
| | | | TPA | AA | BDO | EG | | | | L* | a* | b* | | |
| 25 | 240 | 1:1 | 25.1 | 24.7 | 39.8 | 10.5 | 104.6 | −23.1 | 1.081 | 71.77 | 4.76 | 9.69 | 43 (80) | 192 (250) |
| 26 | 255 | 1.3:1 | 26.0 | 23.8 | 48.4 | 1.8 | 108.3 | −25.6 | 1.355 | 69.04 | 6.61 | 12.32 | 65 (80) | 184 (250) |
| 27 | 240 | 2.5:1 | 25.5 | 24.1 | 51.9 | 0.0 | 128.9 | −29.3 | 1.159 | 66.04 | 8.47 | 13.29 | 56 (80) | 204 (250) |

Techniques and Procedures

Examples 25-27 were prepared using the same procedure as described for the Examples 19-25 with a small change in BDO:(PET+AA) feed mol ratio given in Table 13. Table 12 also shows the glass transition temperature (Tg), melting temperature (Tm) (obtained from DSC), intrinsic viscosity (I.V.), color (L*, a*, b* values obtained through the diffuse reflectance method acquired on a Gretag Macbeth Color-Eye 7000A with D65 illumination).

Discussion

It was observed that the residual EG in the polymer backbone has a great impact on the polymer melting point. It was further observed that the EG content in the backbone is dependent of the BDO:(PET+AA) molar ratio. In order to investigate this experiments were carried out three different BDO:(PET+AA) molar ratios. It can be seen that with increase in the BDO:(PET+AA) mol ratio, EG content in the polymer backbone decreases and melting of the polymer increases. Thus the melting point of the final polymer can be fixed by fixing appropriate BDO:(PET+AA) mol ratio.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. An aliphatic-aromatic copolyester that is a polymer reaction product in which an aliphatic-aromatic copolyester polymer is formed that comprises:
   (a) a dihydric alcohol group, which is a residue of a dihydric alcohol, selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
   (b) an aromatic dicarboxylic acid group, which is a residue of an aromatic dicarboxylic acid, derived from a depolymerized aromatic polyester component selected from poly(ethylene terephthalate)s, poly(butylene terephthalate)s, poly(trimethylene terephthalate)s, and combinations thereof; and
   (c) an adipic acid group, which is a residue of adipic acid;
   wherein the reaction product further comprises an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof;
   wherein the aliphatic-aromatic copolyester has a number average molecular weight of at least 20,000 Daltons and a polydispersity index from 2 to less than 6;
   wherein the reaction product further comprises titanium catalyst that is a product of a process comprising an in situ reaction of an organo-titanium catalyst and a color-reducing amount of a reactant selected from phosphorus-containing compounds, nitrogen-containing compounds, boron-containing compounds, and combinations thereof;
   wherein the aliphatic-aromatic copolyester is made by a process, carried out in the presence of the titanium catalyst, in which the adipic acid group is incorporated into the copolyester when the aromatic polyester component reacts with the first dihydric alcohol and the adipic acid; and
   wherein the copolyester obtains a $T_m$ from 90° C. to 160° C. and a whiteness of at least L*=70.0 as determined by a colorimeter using D65 illumination.

2. The copolyester of claim 1, wherein the dihydric alcohol group is selected from a 1,4-butanediol group, 1,3-propylene glycol group, ethylene glycol group, or combinations thereof.

3. The copolyester of claim 1, wherein the aromatic polyester component comprises a polymer selected from poly(trimethylene terephthalate)s derived from petroleum-derived 1,3-propanediol, poly(trimethylene terephthalate)s derived from bio-derived 1,3-propanediol, poly(butylene terephthalate)s derived from petroleum-derived 1,4-butanediol, poly(butylene terephthalate)s derived from bio-derived 1,4-butanediol, poly(trimethylene terephthalate)s derived from post-consumer poly(ethylene terephthalate)s, poly(butylene terephthalate)s derived from post-consumer poly(ethylene terephthalate)s, virgin poly(ethylene terephthalate)s, recycled poly(ethylene terephthalate)s, post-consumer poly(ethylene terephthalate)s, recycled poly(trimethylene terephthalate)s, recycled copolyesters of terephthalic acid with ethylene glycol and cyclohexane dimethanol, and combinations thereof.

4. The copolyester of claim 1, wherein
the aromatic polyester component comprises poly(butylene terephthalate), and
the aromatic polyester residue is selected from titanium, titanium-containing compounds, tin, tin-containing compounds, epoxies, and combinations thereof.

5. The copolyester of claim 1, wherein
the aromatic polyester component comprises poly(trimethylene terephthalate) and
the aromatic polyester residue is selected from titanium, titanium-containing compounds, tin, tin-containing compounds, epoxies, and combinations thereof.

6. The copolyester of claim 1, wherein
the aromatic polyester component comprises a poly(ethylene terephthalate) homopolymer, copolymers of poly(ethylene terephthalate), or combinations thereof, and
the aromatic copolyester residue is selected from an isophthalic acid group, antimony-containing compounds, germanium-containing compounds, cobalt-containing compounds, tin-containing compounds, aluminum, aluminum salts, alkaline salts, alkaline earth metal salts, phosphorus-containing compounds, sulfur-containing compounds, naphthalene dicarboxylic acid groups, and combinations thereof.

7. The copolyester of claim 6, wherein the dihydric alcohol group is selected from mixtures containing ethylene glycol groups and one or more diethylene glycol groups, a cis isomer of a 1,3-cyclohexanedimethanol group, cis isomer of 1,4-cyclohexanedimethanol group, trans isomer of 1,3-cyclohexanedimethanol group, trans isomer of 1,4-cyclohexanedimethanol group, and combinations thereof.

8. The copolyester of claim 6, wherein the aromatic polyester residue further comprises an isophthalic acid group.

9. The copolyester of claim 1, wherein the titanium catalyst comprises the reaction product of
tetraisopropyl titanate and
a reactant selected from
(1) phosphorus-containing compounds, at a molar ratio of the phosphorus-containing compound:tetraisopropyl titanate from more than 0.5:1 to less than or equal to 3:1,
(2) nitrogen-containing compounds, at a molar ratio of the nitrogen-containing compound:tetraisopropyl titanate from more than 0.5:1 to less than or equal to 4:1, and
(3) boron-containing compounds, at a molar ratio of the boron-containing compound:tetraisopropyl titanate from more than 0.5:1 to less than or equal to 4:1, and
(4) combinations thereof.

10. The copolyester of claim 1, wherein the phosphorus-containing compound is selected from phosphoric acid, poly(phosphoric acid), phosphorus acid, monobutyl phosphate, dibutyl phosphate, monoalkyl phosphates, dialkyl phosphates, or combinations thereof.

11. The copolyester of claim 1, wherein the boron-containing compound is selected from boric acid, boron alkoxides, boric oxides, boron halides, metaborates, monoalkyl borates, dialkyl borates, trialkyl borates, borazines, and combinations thereof.

12. The copolyester of claim 1, wherein the nitrogen-containing compound is selected from alkyl amines, aromatic amines, alkyl aromatic amines, alkanol amines, ammonium compounds, and combinations thereof.

13. The copolyester of claim 1, wherein the copolyester comprises from more than 0 to less than 300 ppm of the phosphorus-containing compound, based on the total weight of the copolyester.

14. The copolyester of claim 1, wherein the copolyester contains from more than 0 to less than 300 ppm of the nitrogen-containing compound, based on the total weight of the copolyester.

15. The copolyester of claim 1, wherein the copolyester contains from more than 0 to less than 300 ppm of the boron-containing compound, based on the total weight of the copolyester.

16. The copolyester of claim 1, having a Tg from −35° C. to 0° C.

17. The copolyester of claim 1, wherein the copolyester has a whiteness of at least L*=70.0; a*=−2.0; b*=−0.2 as determined by a colorimeter using D65 illumination.

18. A composition, comprising a combination of:
(i) from more than 10 to 59.96 wt. %, based on the total weight of the composition, of the aliphatic-aromatic copolyester of claim 1;
(ii) from more than 40 to less than 89.96 wt. %, based on the total weight of the composition, of a polymer selected from aliphatic polyesters, aliphatic polycarbonates, starches, aromatic polyesters, cycloaliphatic polyesters, polyesteramides, aromatic polycarbonates, and combinations thereof;
(iii) from 0.01 to 5 wt. %, based on the total weight of the composition, of an additive selected from nucleating agents, antioxidants, UV stabilizers, plasticizers, epoxy compounds, melt strength additives, and combinations thereof;
(iv) from 0.01 to 45 wt. %, based on the total weight of the composition, of an additive selected from alcohols, acetates, alcohol-acetate copolymers, and combinations thereof; and
(v) from 0.01 to 2 wt. %, based on the weight of the composition, of an additive selected from crosslinkers, anti-aging agents, retrogradation agents, anti-blocking agents, water, odor-controlling agents, and combinations thereof.

19. The composition of claim 18, wherein the aliphatic polyester is selected from poly(lactic acid)s, poly(hydroxyalkanoate)s, poly(butylene succinate)s, poly(butylene adipate)s, poly(butylene succinate adipate)s, poly(caprolactone)s, and combinations thereof.

20. An article extruded, calendared, extrusion molded, blow molded, solvent cast or injection molded from the composition of claim 18.

21. The article of claim 20, wherein the article is a film.

22. The article of claim 20 in the form of a film, wherein the film is formed by extrusion molding or calendaring the composition.

23. An aliphatic-aromatic copolyester that is a polymer reaction product in which an aliphatic-aromatic copolyester polymer is formed comprises:
(a) a dihydric alcohol group, which is a residue of a dihydric alcohol, selected from an ethylene glycol group, 1,2-propylene glycol group, 1,3-propylene glycol group, 1,2-butanediol group, 2,3-butanediol group, 1,4-butanediol group, tetramethyl cyclobutanediol, isosorbide groups, 1,3-cyclohexanedimethanol groups, 1,4-cyclohexanedimethanol groups, hexylene glycol groups, bio-derived diol groups, and combinations thereof;
(b) an aromatic dicarboxylic acid group, which is a residue of an aromatic dicarboxylic acid, derived from a depolymerized aromatic polyester component selected from poly(ethylene terephthalate)s, poly(butylene terephthalate)s, poly(trimethylene terephthalate)s, and combinations thereof; and (c) an adipic acid group, which is a residue of adipic acid;

wherein the reaction product further comprises an aromatic polyester residue selected from an isophthalic acid group, antimony-containing compounds, germanium-containing compounds, cobalt-containing compounds, tin, tin-containing compounds, titanium, titanium-containing compounds, aluminum, aluminum salts, alkaline salts, alkaline earth metal salts, phosphorus-containing compounds, sulfur-containing compounds, naphthalene dicarboxylic acid groups, epoxies, and combinations thereof, wherein the aliphatic-aromatic copolyester has a number average molecular weight of at least 20,000 Daltons and a polydispersity index from 2 to less than 6;

wherein the reaction product further comprises a titanium catalyst comprising titanium and a color-reducing amount of a compound selected from phosphorus-containing compounds, boron-containing compounds, and combinations thereof; wherein the titanium catalyst is a product made by a process comprising an in situ reaction of a tetraisopropyl titanate and a reactant selected from (1) phosphorus-containing compounds, at a molar ratio of the phosphorus-containing compound:tetraisopropyl titanate from more than 0.5:1 to less than or equal to 3:1, and (2) boron-containing compounds, at a molar ratio of the boron-containing compound:tetraisopropyl titanate from more than 0.5:1 to less than or equal to 4:1, and (3) combinations thereof;

wherein the reactant comprises acidic hydroxy groups that achieve complete conversion in the in situ reaction;

wherein the aliphatic-aromatic copolyester is made by a process, carried out in the presence of the titanium catalyst, in which the adipic acid group is incorporated into the an aliphatic-aromatic copolyester polymer when the aromatic polyester component reacts with the first dihydric alcohol and the adipic acid; and wherein the copolyester obtains a $T_m$ from 90° C. to 160° C. and a whiteness of at least $L^*=70.0$ as determined by a colorimeter using D65 illumination.

* * * * *